(12) United States Patent

Kawashima et al.

(10) Patent No.: US 12,687,198 B2

(45) Date of Patent: Jul. 21, 2026

(54) LINEAR MOTION GUIDE UNIT

(71) Applicant: NIPPON THOMPSON CO., LTD., Tokyo (JP)

(72) Inventors: Takafumi Kawashima, Mino (JP); Tomoaki Nakamura, Mino (JP)

(73) Assignee: NIPPON THOMPSON CO., LTD., Tokyo (JP)

( * ) Notice: Subject to any disclaimer, the term of this patent is extended or adjusted under 35 U.S.C. 154(b) by 52 days.

(21) Appl. No.: 18/871,296

(22) PCT Filed: May 11, 2023

(86) PCT No.: PCT/JP2023/017753

§ 371 (c)(1),
(2) Date: Dec. 3, 2024

(87) PCT Pub. No.: WO2023/243268

PCT Pub. Date: Dec. 21, 2023

(65) Prior Publication Data

US 2025/0347319 A1 Nov. 13, 2025

(30) Foreign Application Priority Data

Jun. 17, 2022 (JP) ................................. 2022-097975

(51) Int. Cl.
*F16C 29/06* (2006.01)
*F16C 29/08* (2006.01)

(52) U.S. Cl.
CPC ........ *F16C 29/0638* (2013.01); *F16C 29/082* (2013.01); *F16C 29/088* (2013.01); *F16C 2226/70* (2013.01)

(58) Field of Classification Search
CPC .. F16C 29/06; F16C 29/0633; F16C 29/0635; F16C 29/0638; F16C 29/064;

(Continued)

(56) References Cited

U.S. PATENT DOCUMENTS 5,806,986 A * 9/1998 Barth .................... F16C 29/082
384/45
6,000,292 A 12/1999 Nagai et al.

(Continued)

FOREIGN PATENT DOCUMENTS

CN 112895989 A 6/2021
EP 0448484 A1 * 9/1991 ............ F16C 29/082

(Continued)

OTHER PUBLICATIONS

Sep. 5, 2025 Search Report issued in European Application No. 23823571.7.

(Continued)

*Primary Examiner* — Phillip A Johnson

(74) *Attorney, Agent, or Firm* — Oliff PLC

(57) ABSTRACT

A linear motion guide unit includes a rail including a rail upper surface and a rail side surface each extending in a longitudinal direction and having a first raceway surface provided on the rail side surface, a sliding member relatively movably attached to the rail and including a sliding member lower surface facing the rail upper surface and a second raceway surface facing the first raceway surface, a plurality of rolling elements rolling on a load-carrying race constituted by the first and second raceway surfaces, a cover member covering the rail and the sliding member and including a first fastener extending in the longitudinal direction, a moving member arranged outside the cover member and moving together with the sliding member, and a connecting member connecting the sliding member to the moving member. The first fastener includes a first right side element extending along the longitudinal direction, a first left side element extending in the longitudinal direction along the first right side element and engageable with the (Continued)

first right side element, a first front slider attached to the first right side element and the first left side element and fixed to the sliding member and the moving member, and a first rear slider attached to the first right side element and the first left side element, spaced apart from the first front slider in the longitudinal direction, and fixed to the sliding member and the moving member. During movement of the sliding member and the moving member, the first front slider and the first rear slider each disengage the first right side element and the first left side element from each other while the slider moves in a direction opposite to a side where the other slider is located, and engage the first right side element and the first left side element with each other while the slider moves in a direction toward the side where the other slider is located. The connecting member includes a first support member arranged between the first front slider and the first rear slider in the longitudinal direction and supporting the moving member. As viewed from the rail upper surface side in a direction perpendicular to the longitudinal direction, a first opening region resulting from disengagement between the first right side element and the first left side element is placed in a position avoiding the rail.

17 Claims, 11 Drawing Sheets

(58) Field of Classification Search
CPC ...... F16C 29/08; F16C 29/082; F16C 29/088; F16C 2226/70
See application file for complete search history.

(56) References Cited

U.S. PATENT DOCUMENTS

| | | | | |
|---|---|---|---|---|
| 6,241,230 | B1 | 6/2001 | Kawaguchi | |
| 6,520,320 | B1 * | 2/2003 | Wang ...................... | B23Q 1/58 |
| | | | | 198/750.7 |
| 6,749,057 | B2 * | 6/2004 | Kato ..................... | F16C 29/063 |
| | | | | 198/750.7 |
| 12,546,364 | B2 * | 2/2026 | Nakamura .............. | F16C 29/06 |
| 2021/0355993 | A1 | 11/2021 | Sato et al. | |

FOREIGN PATENT DOCUMENTS

| | | | | |
|---|---|---|---|---|
| JP | H09-201002 | A | 7/1997 | |
| JP | 2000-230618 | A | 8/2000 | |
| JP | 2007-069809 | A | 3/2007 | |
| JP | 2019-202574 | A | 11/2019 | |
| WO | 2010/067437 | A1 | 6/2010 | |
| WO | WO-2019224998 | A1 * | 11/2019 | .............. F16C 29/08 |

OTHER PUBLICATIONS

Jul. 18, 2023 International Search Report issued in International Patent Application No. PCT/JP2023/017753.
Feb. 3, 2026 Office Action issued in Japanese Patent Application No. 2022-097975.

* cited by examiner

LINEAR MOTION GUIDE UNIT

TECHNICAL FIELD

The present disclosure relates to a linear motion guide unit. The present application claims priority based on Japanese Patent Application No. 2022-97975 filed on Jun. 17, 2022, the entire contents of which are incorporated herein by reference.

BACKGROUND ART

A guide apparatus having a dustproof structure in which a portion of a movable body projects outwardly through an opening formed in an outer cover and the movable body moves along the opening is known (see, for example, Patent Literature 1). According to the dustproof guide apparatus disclosed in Patent Literature 1, a plurality of flexible belt-shaped seal members are attached to edge portions of the opening, and the seal members have their end portions overlapping each other.

CITATION LIST

Patent Literature

Patent Literature 1: Japanese Patent Application Laid-Open No. 2000-230618

SUMMARY OF INVENTION

Technical Problem

In order to improve dustproof and waterproof properties, a cover member may be provided for a rail and a sliding member to thereby avoid exposure of the rail and the sliding member as much as possible. In a linear motion guide unit provided with such a cover member, smooth operation of the sliding member is required.

Thus, one of the objects is to provide a linear motion guide unit capable of ensuring smooth operation of the sliding member.

Solution to Problem

A linear motion guide unit according to the present disclosure includes: a rail including a rail upper surface and a rail side surface each extending in a longitudinal direction and having a first raceway surface provided on the rail side surface; a sliding member relatively movably attached to the rail and including a sliding member lower surface facing the rail upper surface and a second raceway surface facing the first raceway surface; a plurality of rolling elements rolling on a load-carrying race constituted by the first and second raceway surfaces; a cover member covering the rail and the sliding member and including a first fastener extending in the longitudinal direction; a moving member arranged outside the cover member and moving together with the sliding member; and a connecting member connecting the sliding member to the moving member. The first fastener includes a first right side element extending along the longitudinal direction, a first left side element extending in the longitudinal direction along the first right side element and engageable with the first right side element, a first front slider attached to the first right side element and the first left side element and fixed to the sliding member and the moving member, and a first rear slider attached to the first right side element and the first left side element, spaced apart from the first front slider in the longitudinal direction, and fixed to the sliding member and the moving member. During movement of the sliding member and the moving member, the first front slider and the first rear slider each disengage the first right side element and the first left side element from each other while the slider moves in a direction opposite to a side where the other slider is located, and engage the first right side element and the first left side element with each other while the slider moves in a direction toward the side where the other slider is located. The connecting member includes a first support member arranged between the first front slider and the first rear slider in the longitudinal direction and supporting the moving member. As viewed from the rail upper surface side in a direction perpendicular to the longitudinal direction, a first opening region resulting from disengagement between the first right side element and the first left side element is placed in a position avoiding the rail.

Advantageous Effects of Invention

The linear motion guide unit described above is capable of ensuring smooth operation of the sliding member.

DESCRIPTION OF EMBODIMENTS

Outline of Embodiments

Figure 1:
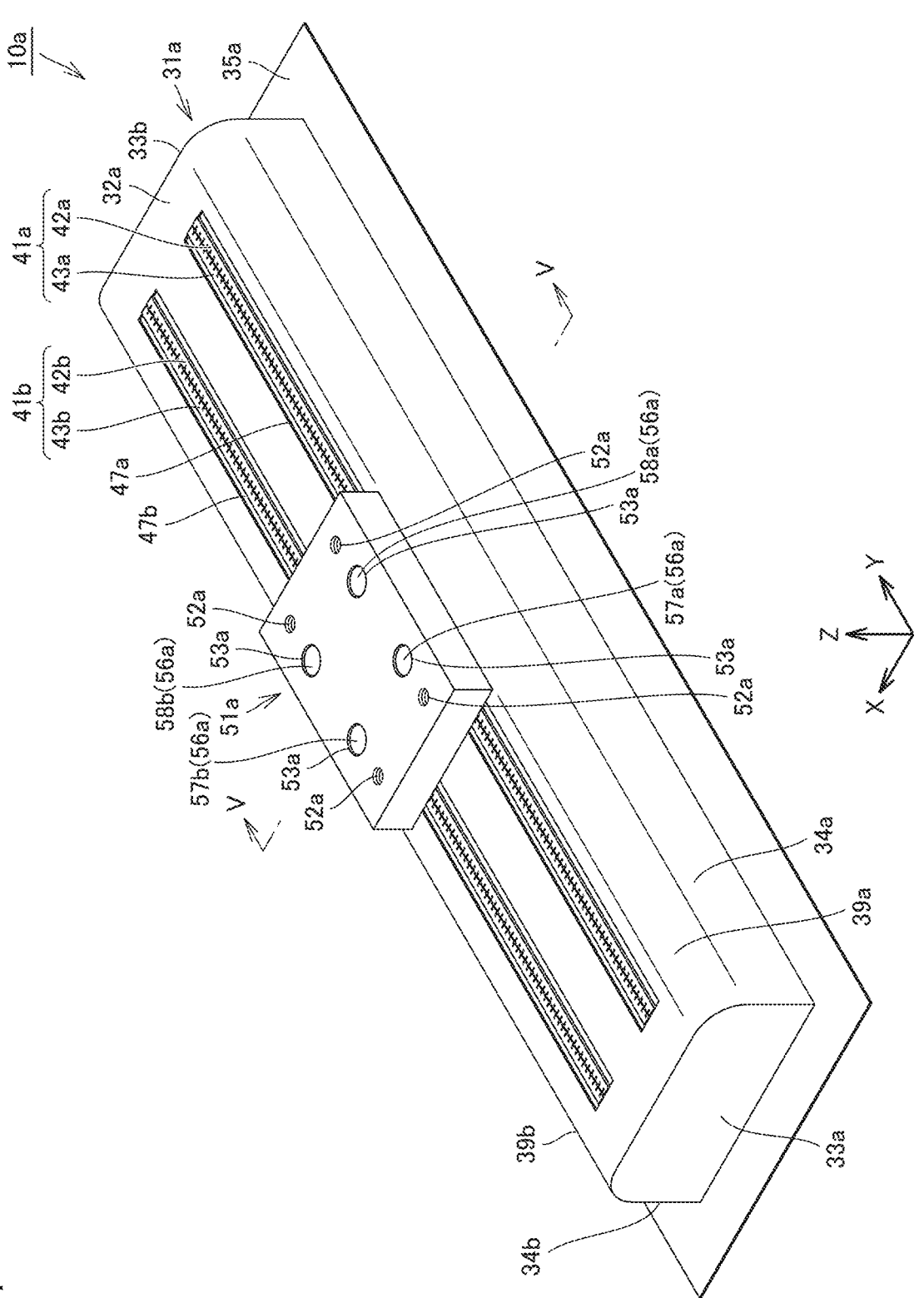
FIG. 1 is a schematic perspective view of a linear motion guide unit in Embodiment 1 of the present disclosure.

A linear motion guide unit of the present disclosure includes: a rail including a rail upper surface and a rail side surface each extending in a longitudinal direction and having a first raceway surface provided on the rail side surface; a sliding member relatively movably attached to the rail and including a sliding member lower surface facing the rail upper surface and a second raceway surface facing the first raceway surface; a plurality of rolling elements rolling on a load-carrying race constituted by the first and second raceway surfaces; a cover member covering the rail and the sliding member and including a first fastener extending in the longitudinal direction; a moving member arranged outside the cover member and moving together with the sliding member; and a connecting member connecting the sliding member to the moving member. The first fastener includes a first right side element extending along the longitudinal direction, a first left side element extending in the longitudinal direction along the first right side element and engageable with the first right side element, a first front slider attached to the first right side element and the first left side element and fixed to the sliding member and the moving member, and a first rear slider attached to the first right side element and the first left side element, spaced apart from the first front slider in the longitudinal direction, and fixed to the sliding member and the moving member. During movement of the sliding member and the moving member, the first front slider and the first rear slider each disengage the first right side element and the first left side element from each other while the slider moves in a direction opposite to a side where the other slider is located, and engage the first right side element and the first left side element with each other while the slider moves in a direction toward the side where the other slider is located. The connecting member includes a first support member arranged between the first front slider and the first rear slider in the longitudinal direction and supporting the moving member. As viewed from the rail upper surface side in a direction perpendicular to the longitudinal direction, a first opening region resulting from disengagement between the first right side element and the first left side element is placed in a position avoiding the rail.

According to the linear motion guide unit of the present disclosure, the rail and the sliding member are covered by the cover member. During operation of the sliding member, i.e., during a linear reciprocating motion of the sliding member, the disengagement and engagement between the first right side element and the first left side element included in the first fastener allow the sliding member to slide while maintaining the state where the rail and the sliding member are covered by the cover member. Thus, it is possible to improve the dustproof and waterproof properties during the sliding of the sliding member. Here, as viewed from the rail upper surface side in a direction perpendicular to the longitudinal direction, the opening region created when the first right side element and the first left side element are separated from each other is placed in a position avoiding the rail. Thus, even if foreign matter such as dust on the cover member enters the inside of the cover member when the first right side element and the first left side element are separated, the risk of the foreign matter reaching the rail can be reduced. This reduces the risk of the foreign matter adhering to the first raceway surface, and avoids obstruction of smooth sliding of the sliding member due to the foreign matter in the load-carrying race composed of the first and second raceway surfaces. Thus, according to such a linear motion guide unit, smooth operation of the sliding member can be ensured. Here, a fastener refers to one having a plurality of teeth (fastener teeth) attached along a longitudinal direction on both sides in a width direction (direction perpendicular to the longitudinal direction) of a cut portion (opening region) extending in the longitudinal direction.

In the linear motion guide unit described above, the cover member may include a second fastener extending in the longitudinal direction and arranged parallel to the first fastener. The second fastener may include a second right side element extending along the longitudinal direction and arranged adjacent to the first left side element, a second left side element extending in the longitudinal direction along the second right side element and engageable with the second right side element, a second front slider attached to the second right side element and the second left side element and fixed to the sliding member and the moving member, and a second rear slider attached to the second right side element and the second left side element, spaced apart from the second front slider in the longitudinal direction, and fixed to the sliding member and the moving member. During movement of the sliding member and the moving member, the second front slider and the second rear slider may each disengage the second right side element and the second left side element from each other while the slider moves in a direction opposite to a side where the other slider is located, and engage the second right side element and the second left side element with each other while the slider moves in a direction toward the side where the other slider is located. The connecting member may include a second support member arranged between the second front slider and the second rear slider in the longitudinal direction and supporting the moving member. As viewed from the rail upper surface side in the direction perpendicular to the longitudinal direction, a second opening region resulting from disengagement between the second right side element and the second left side element may be placed in a position avoiding the rail. In this configuration, since the second opening region is in a position avoiding the rail, even if foreign matter enters from the second opening region, the risk of the foreign matter adhering to the first raceway surface can be reduced, thereby ensuring smooth operation of the sliding member. In addition, since the moving member can be supported by both the first support member and the second support member, the load applied to the moving member can be received in a distributed manner. Accordingly, the load bearing capacity can be improved.

In the linear motion guide unit described above, a region between the first left side element and the second right side element may be composed of an elastic body. This can suppress sagging or bulging of the region between the first left side element and the second right side element at the time of disengagement and engagement during the operation of the sliding member, thereby reducing the risk of the cover member interfering with the rail and the sliding member.

In the linear motion guide unit described above, the cover member may include a tape member provided at a position facing the rail upper surface. The first left side element may be provided at one end in a width direction of the tape member which is a direction perpendicular to the longitudinal direction, and the second right side element may be provided at another end in the width direction of the tape member. This can reduce the risk of longitudinal misalignment between the first left side element and the second right side element, and suppress meandering of the tape member.

The linear motion guide unit described above may further include a shielding member attached to the rail side surface and arranged between the rail side surface and the first opening region of the first fastener as viewed from the rail upper surface side in the direction perpendicular to the longitudinal direction. With this, the shielding member can reduce the risk of foreign matter entering from the rail side surface side in the region not covered by the cover member. Thus, the smooth operation of the sliding member can be more reliably ensured.

In the linear motion guide unit described above, at least a portion of the cover member may include a structure made of a plurality of resin materials of different strengths stacked.

Adopting such a configuration makes it possible to maintain high strength while ensuring appropriate flexibility in at least a portion of the cover member. Thus, the risk of interference with the sliding member can be reduced while suppressing collapse of the shape in at least a portion of the cover member.

In the linear motion guide unit described above, at least a portion of the cover member may make an inside visible from an outside. This makes it easier to check the condition of the inside of the cover member, and improves maintainability.

In the linear motion guide unit described above, at least one of the first front slider and the first rear slider may be provided with a seal member operative to sweep an upper portion of a region in which the first right side element and the first left side element are engaged. With this, the seal member can reduce the risk of foreign matter deposited on top of the cover member entering the inside of the cover member. Thus, the risk of foreign matter entering the load-carrying race can be reduced, and the smooth operation of the sliding member can be more reliably ensured.

In the linear motion guide unit described above, the cover member may include an upper wall portion on which the first fastener is provided, and a side wall portion connected to the upper wall portion and extending in a direction intersecting the upper wall portion. The portion where the upper wall portion and the side wall portion are connected may be configured with a curved surface. This makes it easier for the cover member itself to be deformed, thereby reducing the risk of the cover member sagging or bulging in the state where the first fastener is open. Thus, the risk of interference between the sliding member and the cover member can be reduced, and the smooth operation of the sliding member can be more reliably ensured.

In the linear motion guide unit described above, at least one of the right side element and the left side element may include an oil-containing resin provided at a portion where the elements are engaged with each other. With this, the oil components leaking from the oil-containing resin at the time of disengagement and engagement of the right side element and the left side element can promote the smooth movement of the right side element and the left side element, and the smooth operation of the sliding member can be ensured.

SPECIFIC EMBODIMENTS

Specific embodiments of the linear motion guide unit of the present disclosure will be described below with reference to the drawings. In the drawings referenced below, the same or corresponding portions are denoted by the same reference numerals and the description thereof will not be repeated.

Embodiment 1

An embodiment of the present disclosure, Embodiment 1, will first be described. FIG. 1 is a schematic perspective view of a linear motion guide unit in Embodiment 1 of the present disclosure. In FIG. 1 and the following figures, the X direction indicates a lateral direction, which is the width direction of the linear motion guide unit, the Y direction indicates the longitudinal direction of the linear motion guide unit, and the Z direction indicates the thickness direction (height direction) of the linear motion guide unit. The X, Y, and Z directions are orthogonal to each other. For the sake of convenience in explanation, the direction indicated by the arrow X is regarded as leftward, the direction opposite to that indicated by the arrow X is regarded as rightward, the direction indicated by the arrow Y is regarded as frontward, the direction opposite to that indicated by the arrow Y is regarded as backward, the direction indicated by the arrow Z is regarded as upward, and the direction opposite to that indicated by the arrow Z is regarded as downward. However, these are only for when the linear motion guide unit is arranged as shown in FIG. 1 and others, and the directions of left and right, up and down, or front and back may change depending on, for example, the mounting situation of the linear motion guide unit.

Figure 2:
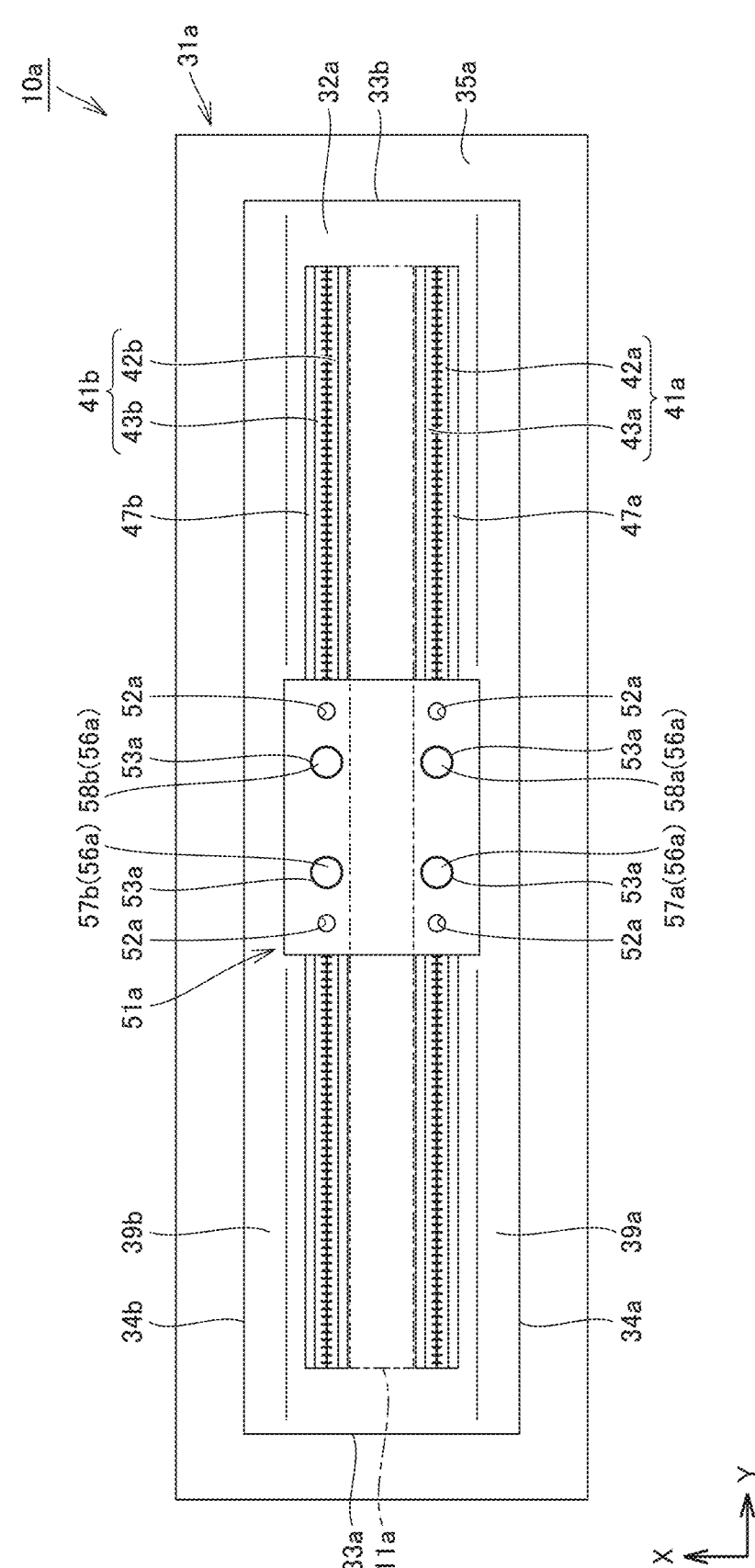
FIG. 2 is a schematic plan view of the linear motion guide unit shown in FIG. 1.
Figure 3:
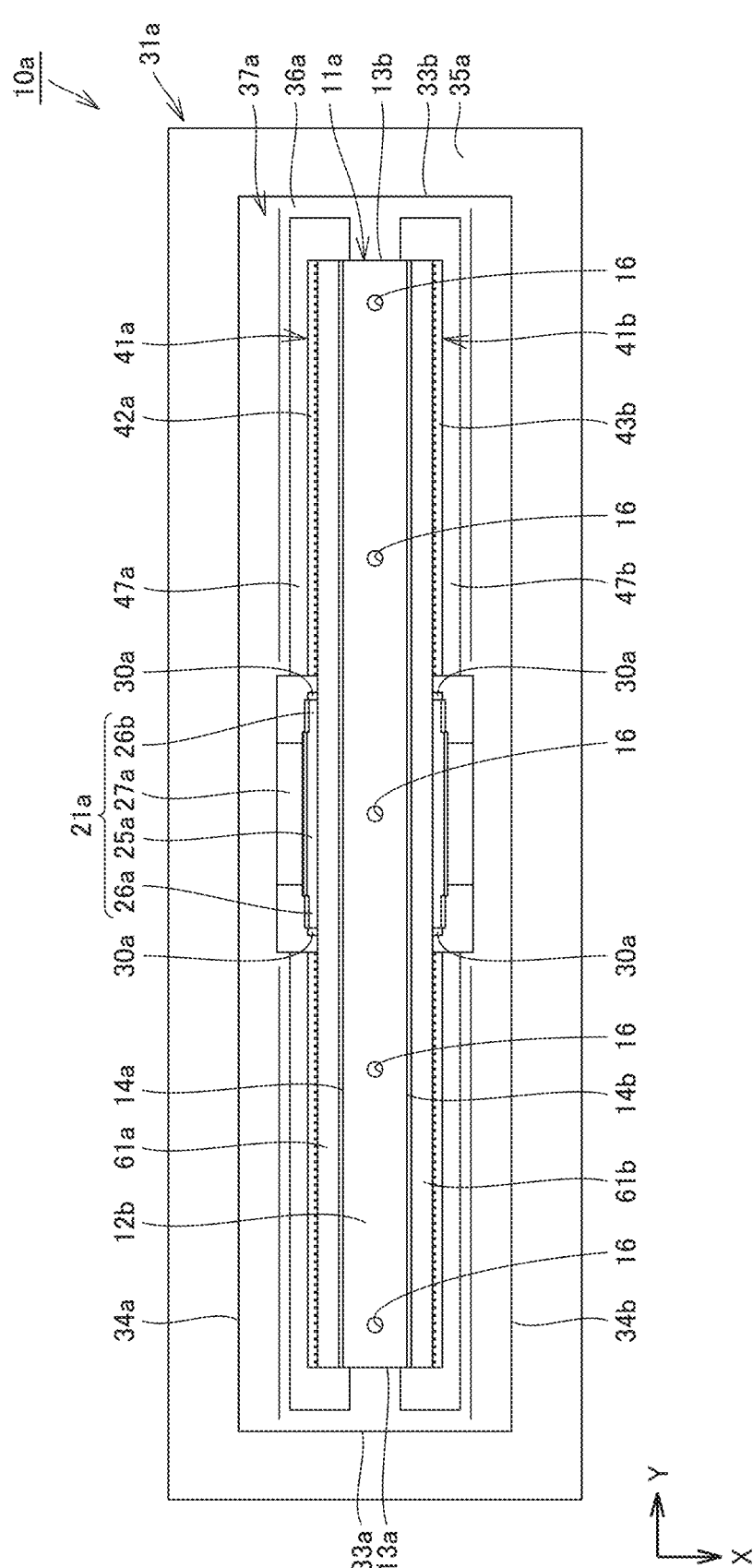
FIG. 3 is a schematic bottom view of the linear motion guide unit shown in FIG. 1.
Figure 4:
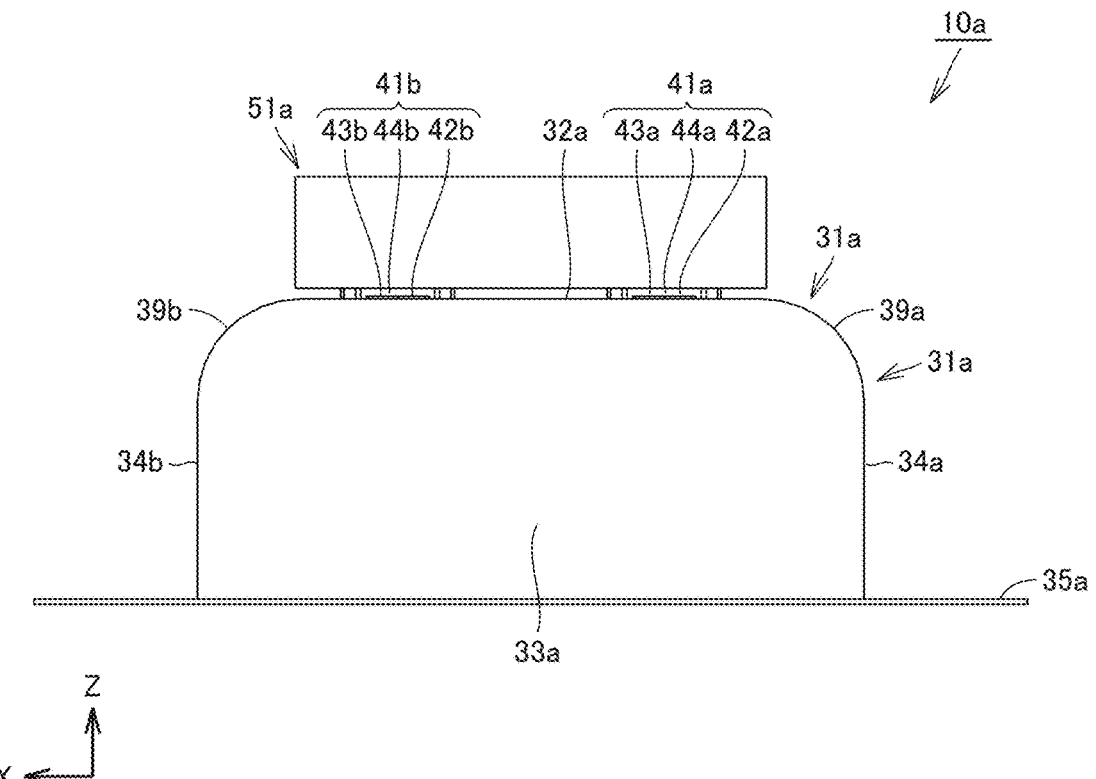
FIG. 4 is a schematic front view of the linear motion guide unit shown in FIG. 1.
Figure 5:
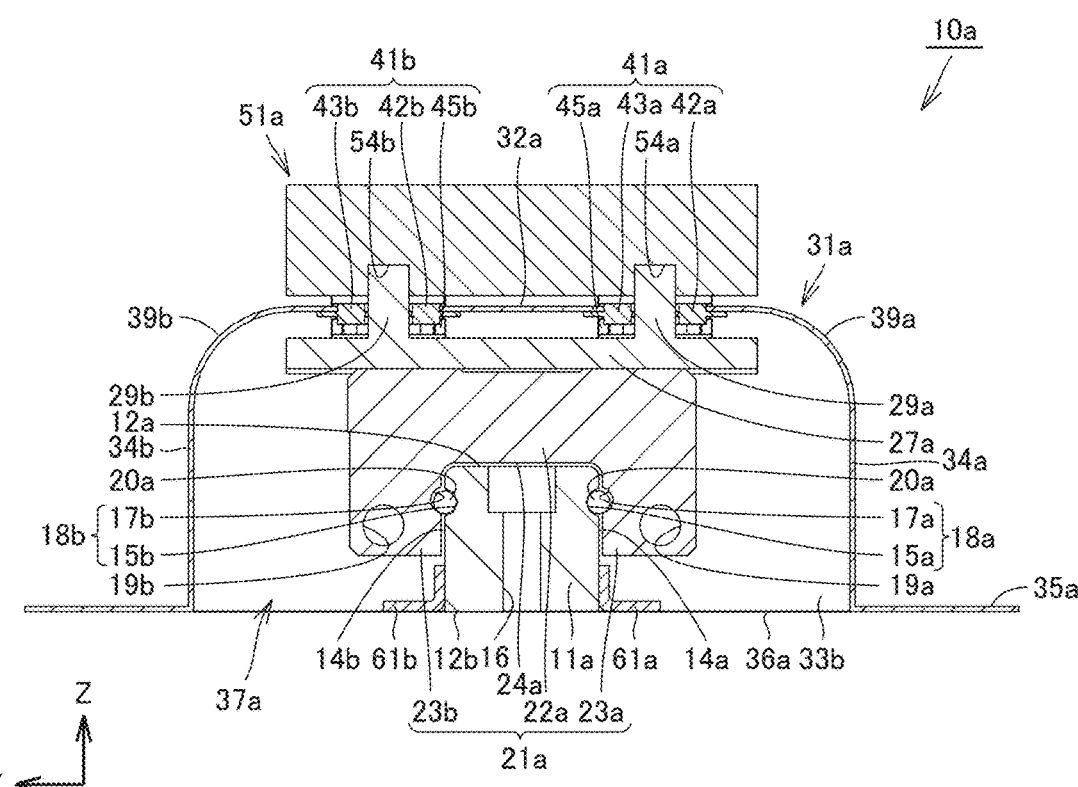
FIG. 5 is a schematic cross-sectional view when cut in a cross section indicated by V-V in FIG. 1.
Figure 6:
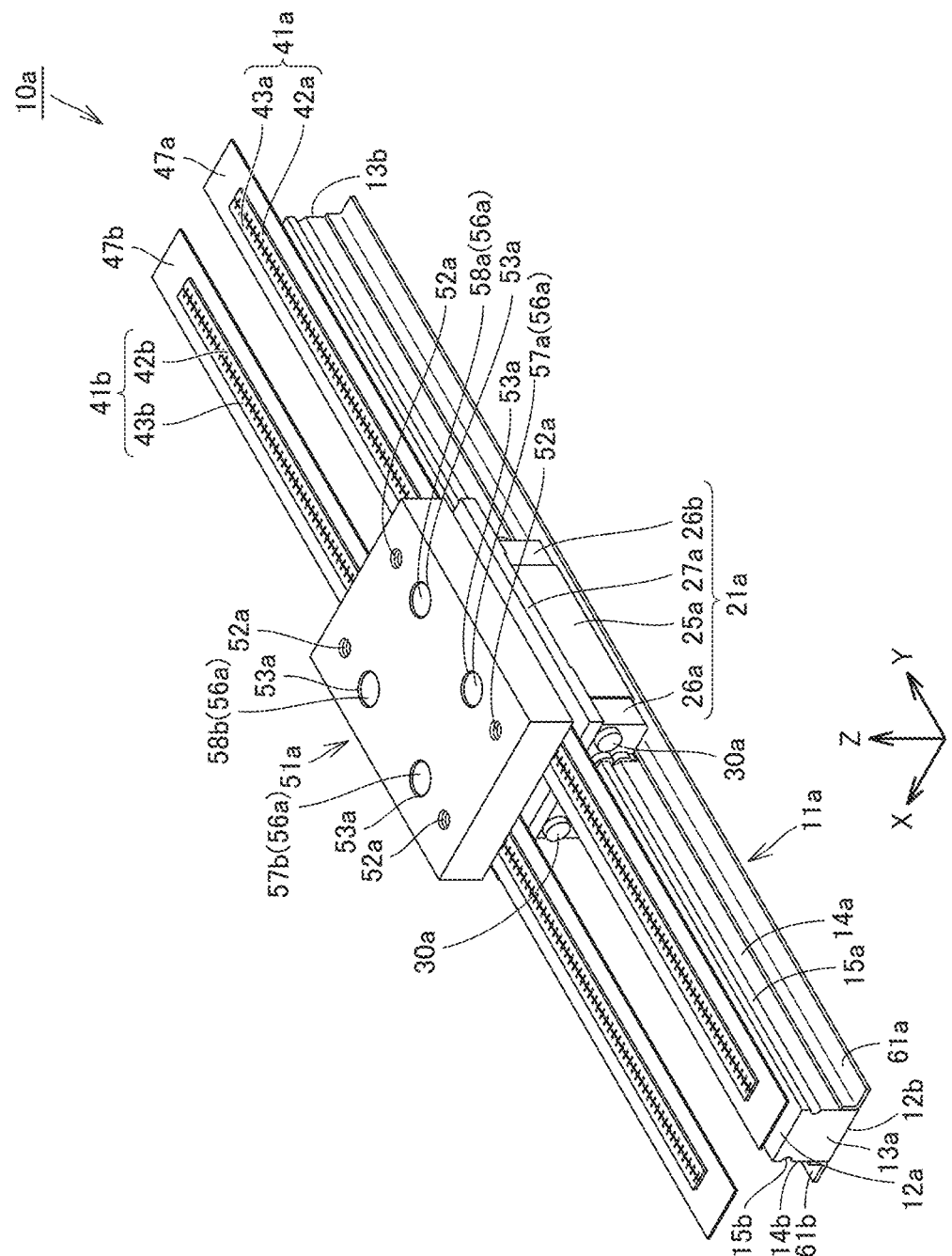
FIG. 6 is a schematic perspective view of the linear motion guide unit shown in FIG. 1, with the illustration of a cover member, described later, partially omitted.
Figure 7:
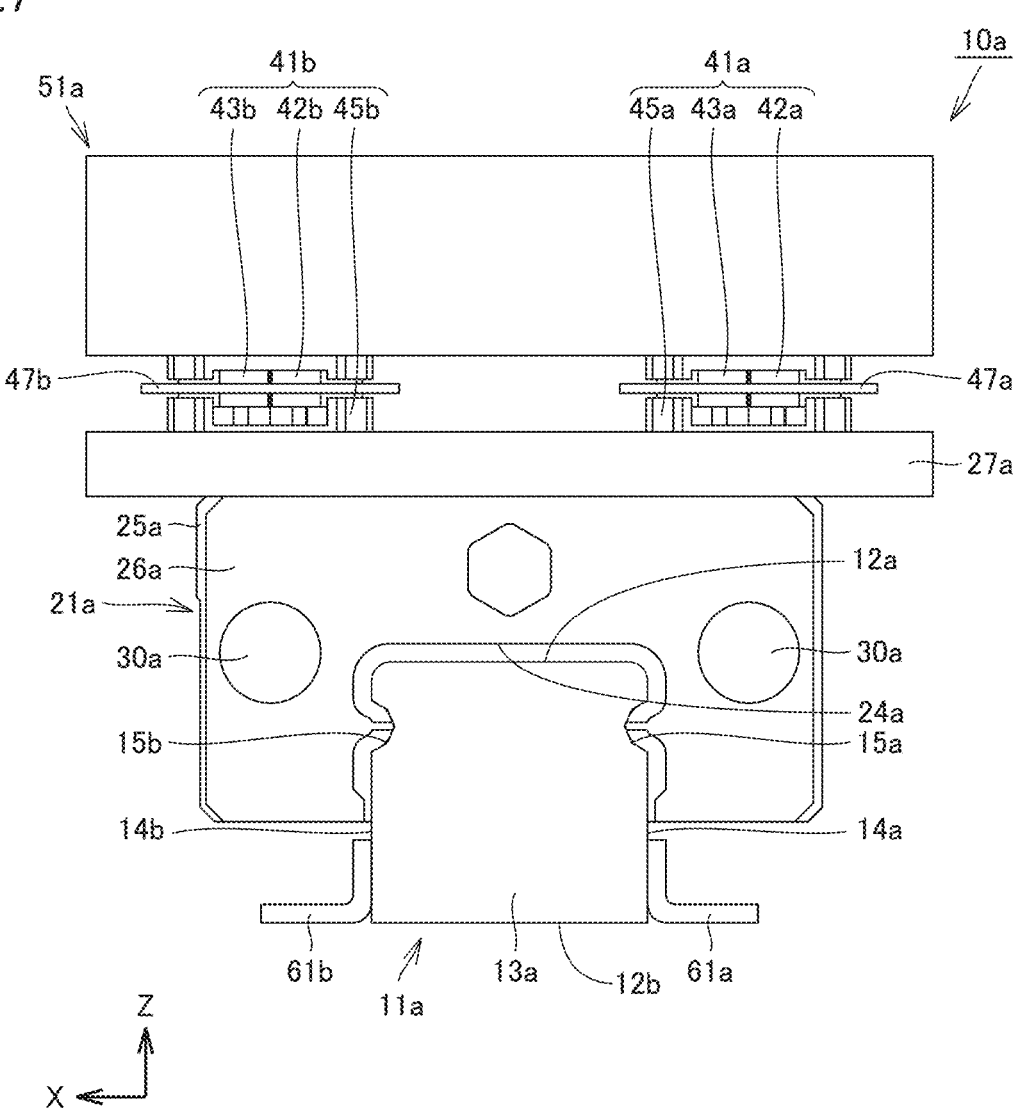
FIG. 7 is a schematic front view of the linear motion guide unit shown in FIG. 6.
Figure 8:
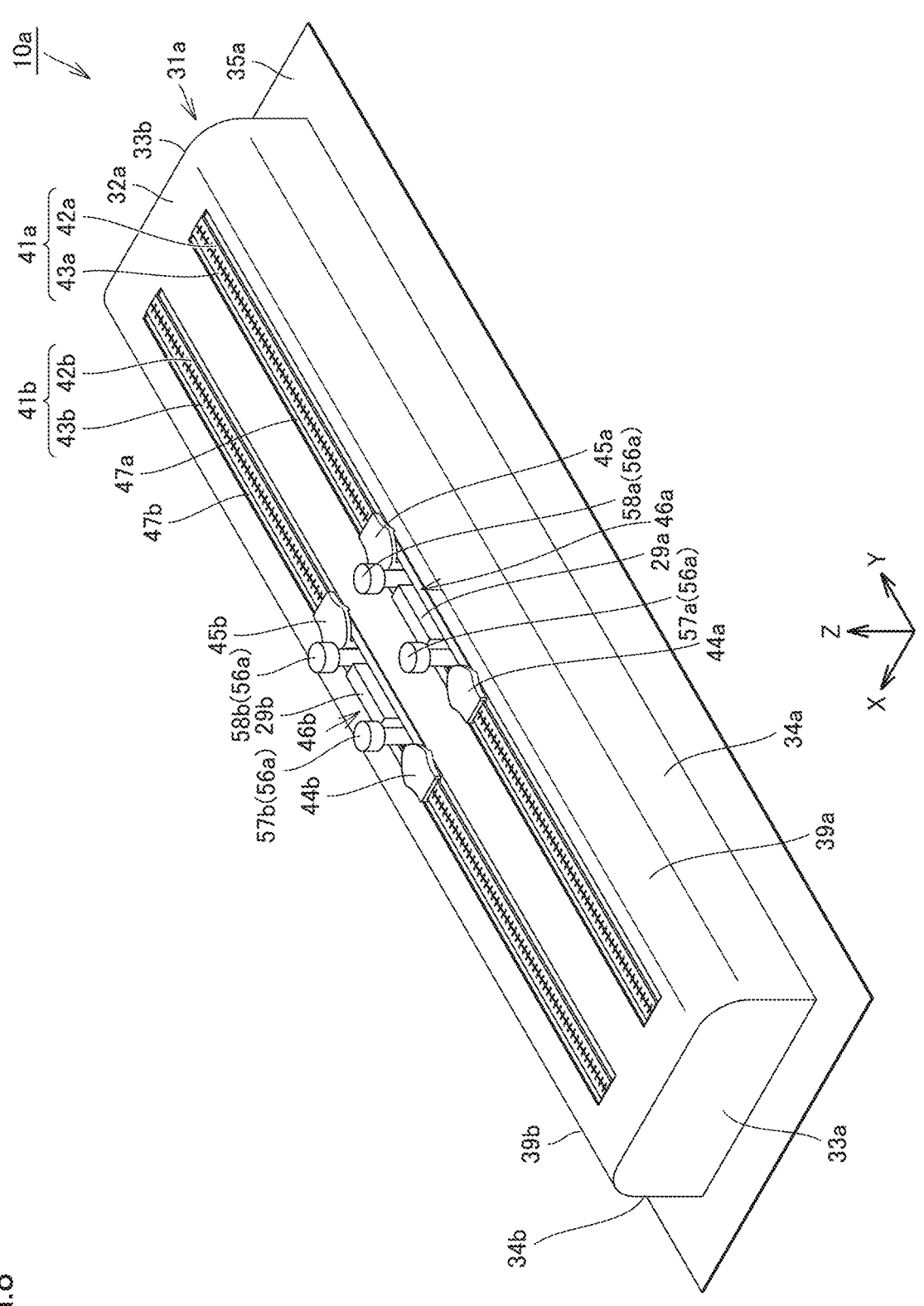
FIG. 8 is a schematic perspective view of the linear motion guide unit shown in FIG. 1, with the illustration of a moving member, described later, omitted.
Figure 9:
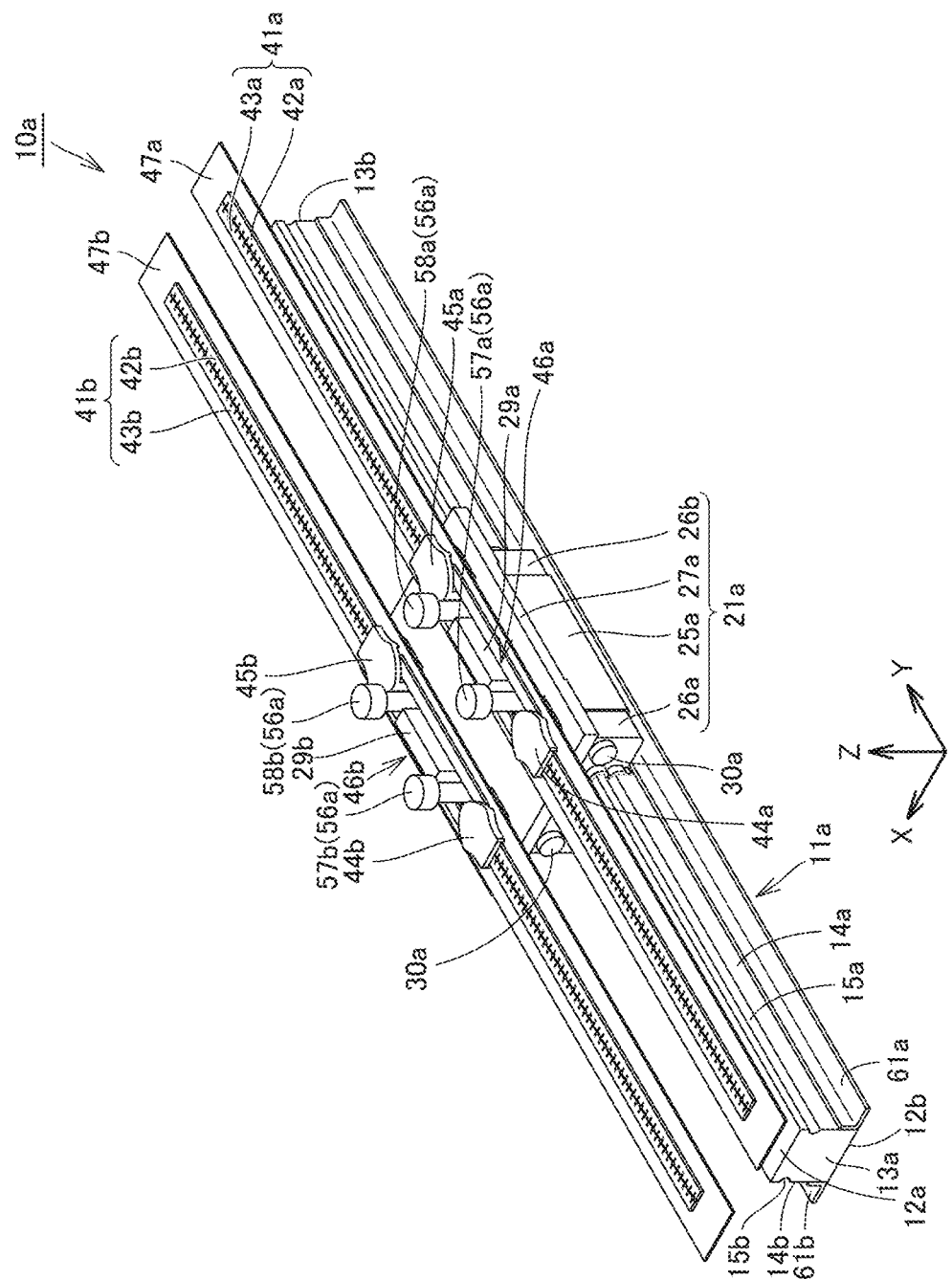
FIG. 9 is a schematic perspective view of the linear motion guide unit shown in FIG. 1, with the illustration of the moving member and a part of the cover member omitted.

FIG. 2 is a schematic plan view of the linear motion guide unit shown in FIG. 1. FIG. 2 is a view of the linear motion guide unit of FIG. 1 in the direction opposite to the direction indicated by the arrow Z. In FIG. 2, the rail is indicated by a long dashed short dashed line. FIG. 3 is a schematic bottom view of the linear motion guide unit shown in FIG. 1. FIG. 3 is a view of the linear motion guide unit of FIG. 1 in the direction indicated by the arrow Z. FIG. 4 is a schematic front view of the linear motion guide unit shown in FIG. 1. FIG. 4 is a view of the linear motion guide unit of FIG. 1 in the direction indicated by the arrow Y. FIG. 5 is a schematic cross-sectional view when cut in a cross section indicated by V-V in FIG. 1. FIG. 6 is a schematic perspective view of the linear motion guide unit shown in FIG. 1, with the illustration of a cover member, described later, partially omitted. FIG. 7 is a schematic front view of the linear motion guide unit shown in FIG. 6. FIG. 8 is a schematic perspective view of the linear motion guide unit shown in FIG. 1, with the illustration of a moving member, described later, omitted. FIG. 9 is a schematic perspective view of the linear motion guide unit shown in FIG. 1, with the illustration of the moving member and a part of the cover member omitted.

Referring to FIGS. 1 to 9, the linear motion guide unit 10a according to Embodiment 1 of the present disclosure includes a rail 11a, a sliding member 21a, balls 20a as a plurality of rolling elements, a cover member 31a, a moving member 51a, and connecting members 56a. It should be noted that such a configuration including the balls 20a as the rolling elements can reduce the size of the device configuration. The configuration of each member will now be described in detail.

The rail 11a includes a rail upper surface 12a and a rail lower surface 12b spaced apart from each other in the Z direction, a rail front surface 13a and a rail back surface 13b spaced apart from each other in the Y direction, and rail side surfaces 14a and 14b on both sides of the rail 11a spaced apart from each other in the X direction. The rail side surface 14a is located on the right side of the rail 11a, and the rail side surface 14b is located on the left side of the rail 11a. The rail 11a includes first raceway surfaces 15a and 15b provided on the rail side surfaces 14a and 14b, respectively, and extending parallel to each other along the longitudinal direction. In other words, the first raceway surfaces 15a and 15b are arranged on the rail side surfaces 14a and 14b, respectively. The first raceway surfaces 15a and 15b are each recessed in a groove shape. The first raceway surfaces 15a and 15b are each recessed in a semicircular arc shape as viewed in the Y direction along the outer shape of the balls 20a as the rolling elements.

The rail 11a has a plurality of through holes 16 provided to penetrate in the Z direction from the rail upper surface 12a to the rail lower surface 12b (see in particular FIG. 3). The plurality of through holes 16 are spaced apart from each other in the Y direction. The through holes 16 are effectively utilized, for example, to mount the rail 11*a* at a predetermined location at the time of use of the linear motion guide unit 10*a*.

The configuration of the sliding member 21*a* will now be described. The sliding member 21*a* is relatively movably attached to the rail 11*a*. The sliding member 21*a* includes a pair of sleeve portions 23*a* and 23*b* arranged on both sides in the width direction of the rail 11*a*, and a base portion 22*a* connected to the respective sleeve portions 23*a* and 23*b*. The pair of sleeve portions 23*a* and 23*b* are spaced apart from each other in the X direction. The base portion 22*a* includes a sliding member lower surface 24*a* that faces the rail upper surface 12*a* when the sliding member 21*a* is attached to the rail 11*a* (see in particular FIG. 5). The sliding member 21*a* is slidably straddled on the rail 11*a*. In the present embodiment, the sliding member 21*a* is attached so as to straddle the rail 11*a* and is movable in the Y direction.

The sliding member 21*a* includes a carriage 25*a*, a front end cap 26*a*, a rear end cap 26*b*, and an intermediate member 27*a*. The carriage 25*a* has a rectangular outer shape as viewed in the Z direction. The carriage 25*a* includes second raceway surfaces 17*a* and 17*b* facing the first raceway surfaces 15*a* and 15*b*, respectively (see in particular FIG. 5). The second raceway surfaces 17*a* and 17*b* extend in parallel along the longitudinal direction and are each recessed in a groove shape. The second raceway surfaces 17*a* and 17*b* are recessed in a semicircular arc shape as viewed in the Y direction along the outer shape of the balls 20*a*. The first raceway surface 15*a* and the second raceway surface 17*a* constitute a load-carrying race 18*a* on which the balls 20*a* roll. The first raceway surface 15*b* and the second raceway surface 17*b* constitute a load-carrying race 18*b* on which the balls 20*a* roll.

The carriage 25*a* has return passages 19*a* and 19*b* provided parallel to the load-carrying races 18*a* and 18*b*, respectively. The return passages 19*a* and 19*b* extend in the longitudinal direction (Y direction), and the balls 20*a* move in the return passages 19*a* and 19*b*.

The front end cap 26*a* is attached with bolts 30*a* to one side in the longitudinal direction of the carriage 25*a*, specifically to the rail front surface 13*a* side of the carriage 25*a* in the longitudinal direction. The front end cap 26*a* has turnaround passages (not shown) for changing the direction of the balls 20*a*. The rear end cap 26*b* is attached to the other side in the longitudinal direction of the carriage 25*a*, specifically to the rail back surface 13*b* side of the carriage 25*a* in the longitudinal direction, with bolts 30*a*. The rear end cap 26*b* has turnaround passages (not shown) for changing the direction of the balls 20*a*. The turnaround passages connect the load-carrying race 18*a* to the return passage 19*a* and the load-carrying race 18*b* to the return passage 19*b*. A plurality of balls 20*a* circulate through the load-carrying race 18*a*, the turnaround passage provided in the front end cap 26*a*, the return passage 19*a*, and the turnaround passage provided in the rear end cap 26*b*. A plurality of balls 20*a* circulate through the load-carrying race 18*b*, the turnaround passage provided in the front end cap 26*a*, the return passage 19*b*, and the turnaround passage provided in the rear end cap 26*b*.

The carriage 25*a* is provided with a plurality of, specifically four, mounting holes (not shown) spaced apart from each other in the X and Y directions. These mounting holes are utilized by the connecting members 56*a* to connect the sliding member 21*a* including the carriage 25*a* to the moving member 51*a*.

The intermediate member 27*a* is plate-shaped, and rectangular as viewed in the Z direction. In the Z direction, the intermediate member 27*a* is arranged between the carriage 25*a*, the front end cap 26*a*, and the rear end cap 26*b* on the one hand and an upper wall portion 32*a*, described later, of the cover member 31*a* on the other hand. The intermediate member 27*a* is fixed to the carriage 25*a*. The intermediate member 27*a* is provided so as to be slidable together with the carriage 25*a*, the front end cap 26*a*, and the rear end cap 26*b*. The intermediate member 27*a* is provided with a pair of positioning projections 29*a* and 29*b* projecting in the thickness direction (Z direction). The pair of positioning projections 29*a* and 29*b* are spaced apart from each other in the X direction. The pair of positioning projections 29*a* and 29*b* each have a shape extending in the Y direction. These positioning projections 29*a* and 29*b* are utilized for positioning the moving member 51*a* when the intermediate member 27*a* and the moving member 51*a* are connected.

The configuration of the cover member 31*a* covering the rail 11*a* and the sliding member 21*a* will now be described. The cover member 31*a* includes an upper wall portion 32*a*, a front side wall portion 33*a*, a back side wall portion 33*b*, a right side wall portion 34*a*, a left side wall portion 34*b*, and a flat plate portion 35*a*. The cover member 31*a* has a rectangular outer shape which is longer in the longitudinal direction (Y direction) than in the lateral direction (X direction) as viewed in the thickness direction (Z direction) of the flat plate portion 35*a*. The flat plate portion 35*a* has an opening 36*a* provided at the center. The front side wall portion 33*a*, the back side wall portion 33*b*, the right side wall portion 34*a*, and the left side wall portion 34*b* are provided so as to rise from the flat plate portion 35*a*. The front side wall portion 33*a* and the back side wall portion 33*b* are each connected to the upper wall portion 32*a* and extend in a direction intersecting the upper wall portion 32*a*. Similarly, the right side wall portion 34*a* and the left side wall portion 34*b* are each connected to the upper wall portion 32*a* and extend in a direction intersecting the upper wall portion 32*a*. In the present embodiment, the front side wall portion 33*a*, the back side wall portion 33*b*, the right side wall portion 34*a*, and the left side wall portion 34*b* are provided so as to rise perpendicularly in the thickness direction (Z direction) of the flat plate portion 35*a*. The front side wall portion 33*a* and the back side wall portion 33*b* are spaced apart from each other in the Y direction. The right side wall portion 34*a* and the left side wall portion 34*b* are spaced apart from each other in the X direction. The upper wall portion 32*a* is arranged connected to the front side wall portion 33*a*, the back side wall portion 33*b*, the right side wall portion 34*a*, and the left side wall portion 34*b*. The upper wall portion 32*a* is arranged to be parallel to the flat plate portion 35*a*, spaced apart in the Z direction.

A portion 39*a* at which the upper wall portion 32*a* and the right side wall portion 34*a* are connected is configured with a curved surface. Similarly, a portion 39*b* at which the upper wall portion 32*a* and the left side wall portion 34*b* are connected is configured with a curved surface. In the present embodiment, the portion 39*a* where the upper wall portion 32*a* and the right side wall portion 34*a* are connected and the portion 39*b* where the upper wall portion 32*a* and the left side wall portion 34*b* are connected each constitute a R surface when the linear motion guide unit 10*a* is viewed from the front (in the Y direction). The cover member 31*a* covers the rail 11*a* and the sliding member 21*a* in a space 37*a* surrounded by the upper wall portion 32*a*, the front side wall portion 33*a*, the back side wall portion 33*b*, the right side wall portion 34*a*, and the left side wall portion 34*b*. This makes it easier for the cover member 31*a* itself to be deformed, thereby reducing the risk of the cover member 31a sagging or bulging in the state where a first fastener 41a or a second fastener 41b, described later, is open. Therefore, the risk of interference between the sliding member 21a and the cover member 31a can be reduced, and the smooth operation of the sliding member 21a can be more reliably ensured. It should be noted that the cover member 31a is attached, for example, by fixing the flat plate portion 35a at a predetermined installation location using an adhesive or screws. The flat plate portion 35a may be provided with a plurality of screw holes penetrating in the thickness direction, for use in attaching screws.

At least a portion of the cover member 31a has a structure made of a plurality of resin materials of different strengths stacked. Specifically, the cover member 31a is made entirely of urethane rubber, for example. Then, urethane tarpaulin, hot-melt sheet, or the like can be attached to a portion of the cover member 31a, the flat plate portion 35a, by gluing or welding, to thereby maintain high strength while ensuring appropriate flexibility in the flat plate portion 35a. In other words, the region where the flat plate portion 35a is located has a structure made of urethane rubber and urethane tarpaulin stacked. Thus, the risk of interference with the sliding member 21a can be reduced while the collapse of the shape can be suppressed in at least a portion of the cover member 31a, the flat plate portion 35a. As for the material for at least a portion of the cover member 31a, the region between a first left side element 43a and a second right side element 42b, which will be described later, may be composed of an elastic body other than urethane rubber.

The linear motion guide unit 10a includes shielding members 61a and 61b. The shielding members 61a and 61b each have a shape obtained by bending a plate-shaped member into an L shape and are provided so as to extend in the longitudinal direction. The shielding member 61a is attached to the rail side surface 14a and is arranged between the rail side surface 14a and a first opening region 46a of a first fastener 41a, described later, as viewed from the rail upper surface 12a side in a direction perpendicular to the longitudinal direction. The shielding member 61b is attached to the rail side surface 14b and is arranged between the rail side surface 14b and a second opening region 46b of a second fastener 41b, described later, as viewed from the rail upper surface 12a side in the direction perpendicular to the longitudinal direction.

The cover member 31a includes a first fastener 41a and a second fastener 41b each extending in the longitudinal direction (Y direction). The first fastener 41a and the second fastener 41b are each provided on the upper wall portion 32a. Specifically, the first fastener 41a is formed on a first tape member 47a, and the first tape member 47a with the first fastener 41a formed thereon constitutes a portion of the upper wall portion 32a of the cover member 31a. The second fastener 41b is formed on a second tape member 47b, and the second tape member 47b with the second fastener 41b formed thereon constitutes a portion of the upper wall portion 32a of the cover member 31a. The first fastener 41a and the second fastener 41b are arranged in parallel, spaced apart in the X direction. The first fastener 41a is provided on the right side with respect to the second fastener 41b.

The configuration of the first fastener 41a will now be described. The first fastener 41a includes a first right side element 42a, a first left side element 43a, a first front slider 44a, and a first rear slider 45a. The first right side element 42a extends along the longitudinal direction. The first left side element 43a is provided to extend in the longitudinal direction along the first right side element 42a. That is, the first right side element 42a and the first left side element 43a are disposed adjacent to each other in the X direction. The first left side element 43a is configured to be engageable with the first right side element 42a. The first front slider 44a is attached to the first right side element 42a and the first left side element 43a. The first front slider 44a is fixed to the sliding member 21a, specifically to the intermediate member 27a. The first rear slider 45a, similarly to the first front slider 44a, is attached to the first right side element 42a and the first left side element 43a. The first rear slider 45a is positioned apart from the first front slider 44a in the longitudinal direction (Y direction). The first rear slider 45a, similarly to the first front slider 44a, is fixed to the sliding member 21a, specifically to the intermediate member 27a.

During movement of the sliding member 21a, the first front slider 44a and the first rear slider 45a each disengage the first right side element 42a and the first left side element 43a from each other while the slider moves in a direction opposite to a side where the other slider is located, and engage the first right side element 42a and the first left side element 43a with each other while the slider moves in a direction toward the side where the other slider is located. A first opening region 46a is formed between the first front slider 44a and the first rear slider 45a in the longitudinal direction, which region is created when the first right side element 42a and the first left side element 43a are disengaged (see in particular FIGS. 8 and 9). In this first opening region 46a, first support members 57a and 58a, which will be described later, are arranged. It should be noted that the moving member 51a is arranged above this first opening region 46a, so that the first opening region 46a is not visible from the outside, in particular from the Z direction.

The configuration of the second fastener 41b will now be described. The second fastener 41b includes a second right side element 42b, a second left side element 43b, a second front slider 44b, and a second rear slider 45b. The second right side element 42b extends along the longitudinal direction. Specifically, the second fastener 41b is arranged such that the first left side element 43a of the first fastener 41a and the second right side element 42b of the second fastener 41b are spaced apart and adjacent to each other in the X direction. The second left side element 43b is provided to extend in the longitudinal direction along the second right side element 42b. That is, the second right side element 42b and the second left side element 43b are disposed adjacent to each other in the X direction. The second left side element 43b is configured to be engageable with the second right side element 42b. The second front slider 44b is attached to the second right side element 42b and the second left side element 43b. The second front slider 44b is fixed to the sliding member 21a, specifically to the intermediate member 27a. The second rear slider 45b, similarly to the second front slider 44b, is attached to the second right side element 42b and the second left side element 43b. The second rear slider 45b is positioned apart from the second front slider 44b in the longitudinal direction (Y direction). The second rear slider 45b, similarly to the second front slider 44b, is fixed to the sliding member 21a, specifically to the intermediate member 27a.

During movement of the sliding member 21a, the second front slider 44b and the second rear slider 45b each disengage the second right side element 42b and the second left side element 43b from each other while the slider moves in a direction opposite to a side where the other slider is located, and engage the second right side element 42b and the second left side element 43b with each other while the slider moves in a direction toward the side where the other slider is located. A second opening region 46b is formed between the second front slider 44b and the second rear slider 45b in the longitudinal direction, which region is created when the second right side element 42b and the second left side element 43b are disengaged (see in particular FIGS. 8 and 9). In this second opening region 46b, second support members 57b and 58b, which will be described later, are arranged. It should be noted that the moving member 51a is arranged above this second opening region 46b as well, so that the second opening region 46b is not visible from the outside, in particular from the Z direction.

The moving member 51a is plate-shaped. The moving member 51a has a rectangular outer shape as viewed in the Z direction. The moving member 51a is disposed outside the cover member 31a. Specifically, the moving member 51a is disposed above the upper wall portion 32a of the cover member 31a. The moving member 51a is arranged to straddle the two rows of the first fastener 41a and the second fastener 41b. The moving member 51a is provided with a plurality of attachment holes 52a. These attachment holes 52a are utilized for attaching a conveying member (not shown) which is conveyed together with the moving member 51a. The moving member 51a is provided with a plurality of connection holes 53a for connecting the member to the sliding member 21a, specifically to the intermediate member 27a included in the sliding member 21a. In the present embodiment, a total of four connection holes 53a are provided spaced apart from each other in the X and Y directions. The moving member 51a is also provided with a pair of receiving recesses 54a and 54b recessed inwardly from a lower surface located on the rail 11a side (see in particular FIG. 5). These receiving recesses 54a and 54b are shaped to receive the pair of positioning projections 29a and 29b, respectively, provided in the intermediate member 27a. The moving member 51a is connected and fixed to the intermediate member 27a included in the sliding member 21a through the connection holes 53a and the receiving recesses 54a and 54b, by utilizing the connecting members 56a, specifically first support members 57a, 58a and second support members 57b, 58b.

The connecting members 56a connect the sliding member 21a to the moving member 51a. The connecting members 56a include the first support members 57a, 58a and the second support members 57b, 58b. The first support members 57a and 58a each have a bolt shape extending in the Z direction. The first support members 57a and 58a are disposed apart from each other in the longitudinal direction. The first support members 57a and 58a are each disposed between the first front slider 44a and the first rear slider 45a in the longitudinal direction. Specifically, the first support members 57a and 58a are arranged in the first opening region 46a described above. In other words, the sliding member 21a covered by the cover member 31a and the moving member 51a disposed outside the cover member 31a can be connected by the first support members 57a and 58a via the first opening region 46a. The second support members 57b and 58b each have a bolt shape extending in the Z direction. The second support members 57b and 58b are disposed apart from each other in the longitudinal direction. The second support members 57b and 58b are each disposed between the second front slider 44b and the second rear slider 45b in the longitudinal direction. Specifically, the second support members 57b and 58b are arranged in the second opening region 46b described above. In other words, the sliding member 21a covered by the cover member 31a and the moving member 51a disposed outside the cover member 31a can be connected by the second support members 57b and 58b via the second opening region 46b. In the present embodiment, the moving member 51a is supported by the first support members 57a, 58a and the second support members 57b, 58b.

Here, as viewed from the rail upper surface 12a side in the direction perpendicular to the longitudinal direction, the first opening region 46a created when the first right side element 42a and the first left side element 43a are separated from each other is placed in a position avoiding the rail 11a. In other words, the first opening region 46a is in a position that does not overlap the rail 11a as viewed in the Z direction. In the present embodiment, as viewed from the rail upper surface 12a side in the direction perpendicular to the longitudinal direction, the first fastener 41a is placed in a position avoiding the rail 11a.

Similarly, as viewed from the rail upper surface 12a side in the direction perpendicular to the longitudinal direction, the second opening region 46b created when the second right side element 42b and the second left side element 43b are separated from each other is placed in a position avoiding the rail 11a. In other words, the second opening region 46b is in a position that does not overlap the rail 11a as viewed in the Z direction. In the present embodiment, as viewed from the rail upper surface 12a side in the direction perpendicular to the longitudinal direction, the second fastener 41b is placed in a position avoiding the rail 11a. More specifically, as viewed from the rail upper surface 12a side in the direction perpendicular to the longitudinal direction, the rail 11a is arranged between the first opening region 46a and the second opening region 46b in the X direction.

According to the linear motion guide unit 10a having such a configuration, the rail 11a and the sliding member 21a are covered by the cover member 31a. During operation of the sliding member 21a, i.e., during a linear reciprocating motion of the sliding member 21a, the disengagement and engagement of the first right side element 42a and the first left side element 43a included in the first fastener 41a allow the sliding member 21a to slide while maintaining the state where the rail 11a and the sliding member 21a are covered by the cover member 31a. This improves the dustproof and waterproof properties during sliding of the sliding member 21a. Here, as viewed from the rail upper surface 12a side in the direction perpendicular to the longitudinal direction, the first opening region 46a created when the first right side element 42a and the first left side element 43a are separated from each other is placed in a position avoiding the rail 11a, so even if foreign matter such as dust on the cover member 31a enters the inside of the cover member 31a when the first right side element 42a and the first left side element 43a are separated, the risk of the foreign matter reaching the rail 11a can be reduced. Consequently, the risk of the foreign matter adhering to the first raceway surfaces 15a and 15b can be reduced, and in the load-carrying races 18a and 18b composed of the first raceway surfaces 15a and 15b and the second raceway surfaces 17a and 17b, the obstruction of the smooth sliding of the sliding member 21a due to the foreign matter can be avoided. Therefore, according to such a linear motion guide unit 10a, smooth operation of the sliding member 21a can be ensured.

Furthermore, the linear motion guide unit 10a includes the second fastener 41b having the above configuration. Thus, since the second opening region 46b is placed in a position avoiding the rail 11a, even if foreign matter enters from the second opening region 46b, the risk of the foreign matter adhering to the first raceway surfaces 15a and 15b can be reduced, thereby ensuring smooth operation of the sliding member 21a. In addition, since the moving member 51*a* can be supported by both the first support members 57*a*, 58*a* and the second support members 57*b*, 58*b*, the load applied to the moving member 51*a* can be received in a distributed manner. Accordingly, the load bearing capacity can be improved.

In the present embodiment, the region between the first left side element 43*a* and the second right side element 42*b* is composed of an elastic body. This can suppress sagging or bulging of the region between the first left side element 43*a* and the second right side element 42*b* at the time of disengagement and engagement during the operation of the sliding member 21*a*, thereby reducing the risk of the cover member 31*a* interfering with the rail 11*a* and the sliding member 21*a*.

In the present embodiment, the shielding member 61*a* is attached to the rail side surface 14*a* and is arranged between the rail side surface 14*a* and the first opening region 46*a* of the first fastener 41*a* as viewed from the rail upper surface 12*a* side in the direction perpendicular to the longitudinal direction. In addition, the shielding member 61*b* is attached to the rail side surface 14*b* and is arranged between the rail side surface 14*b* and the second opening region 46*b* of the second fastener 41*b* as viewed from the rail upper surface 12*a* side in the direction perpendicular to the longitudinal direction. Thus, in the regions not covered by the cover member 31*a*, the shielding members 61*a* and 61*b* can reduce the risk of foreign matter entering from the sides of the rail side surfaces 14*a* and 14*b*. Accordingly, the smooth operation of the sliding member 21*a* can be more reliably ensured.

Embodiment 2

Figure 10:
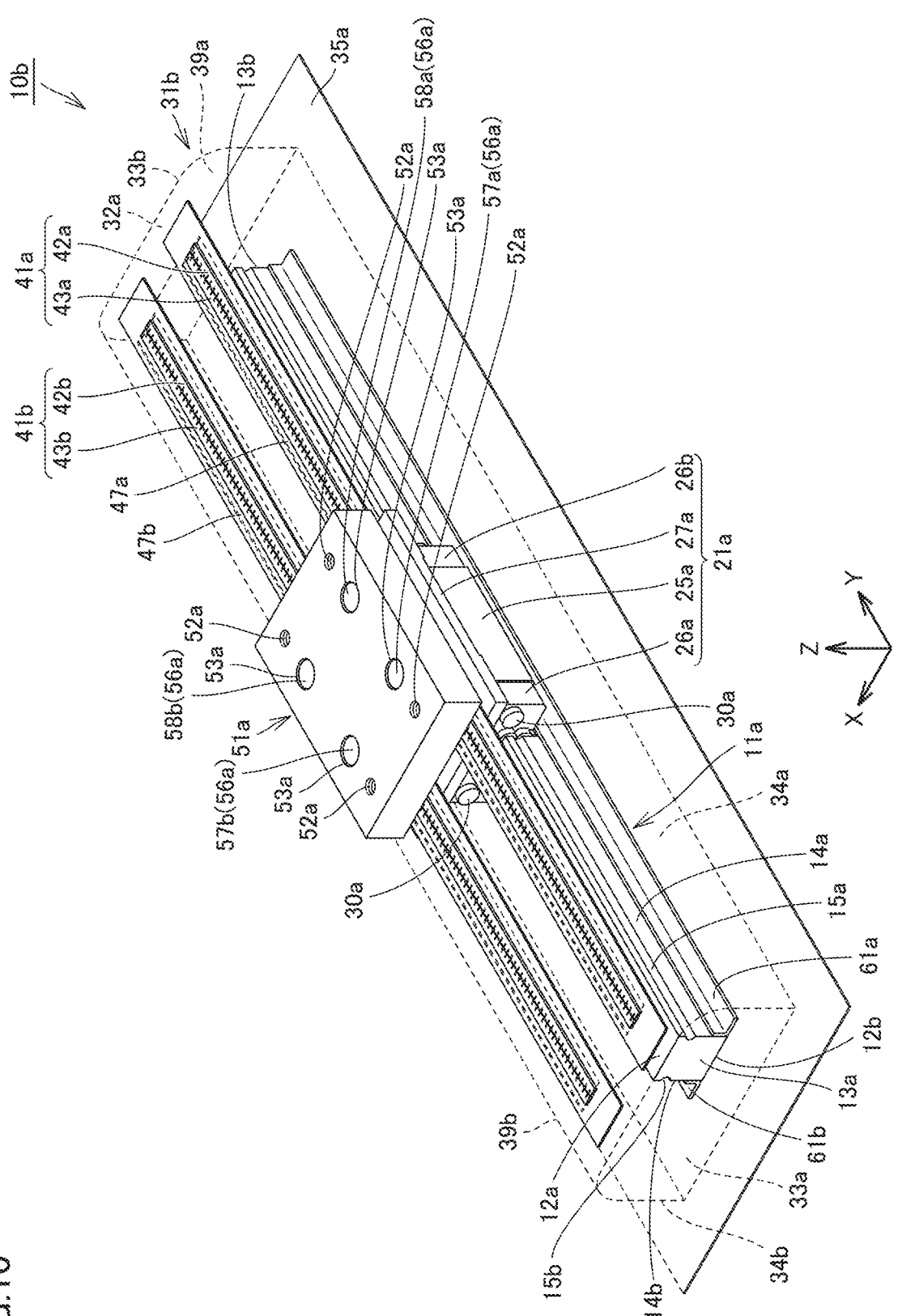
FIG. 10 is a schematic perspective view of a linear motion guide unit in Embodiment 2 of the present disclosure.

Another embodiment, Embodiment 2, will now be described. FIG. 10 is a schematic perspective view of a linear motion guide unit in Embodiment 2 of the present disclosure.

Referring to FIG. 10, in the linear motion guide unit 10*b* of Embodiment 2, an upper wall portion 32*a*, a front side wall portion 33*a*, a back side wall portion 33*b*, a right side wall portion 34*a*, and a left side wall portion 34*b* included in a cover member 31*b* make the inside visible from the outside. Specifically, the upper wall portion 32*a*, the front side wall portion 33*a*, the back side wall portion 33*b*, the right side wall portion 34*a*, and the left side wall portion 34*b* included in the cover member 31*b* are made of a transparent resin. This makes it easier to check the condition of the inside of the cover member 31*b*, and improves maintainability. It should be noted that a configuration making the inside visible is not necessarily provided in all of the upper wall portion 32*a*, the front side wall portion 33*a*, the back side wall portion 33*b*, the right side wall portion 34*a*, and the left side wall portion 34*b* described above. For example, a transparent configuration may be provided in the regions corresponding to the portions 39*a* and 39*b* in Embodiment 1 described above.

Embodiment 3

Figure 11:
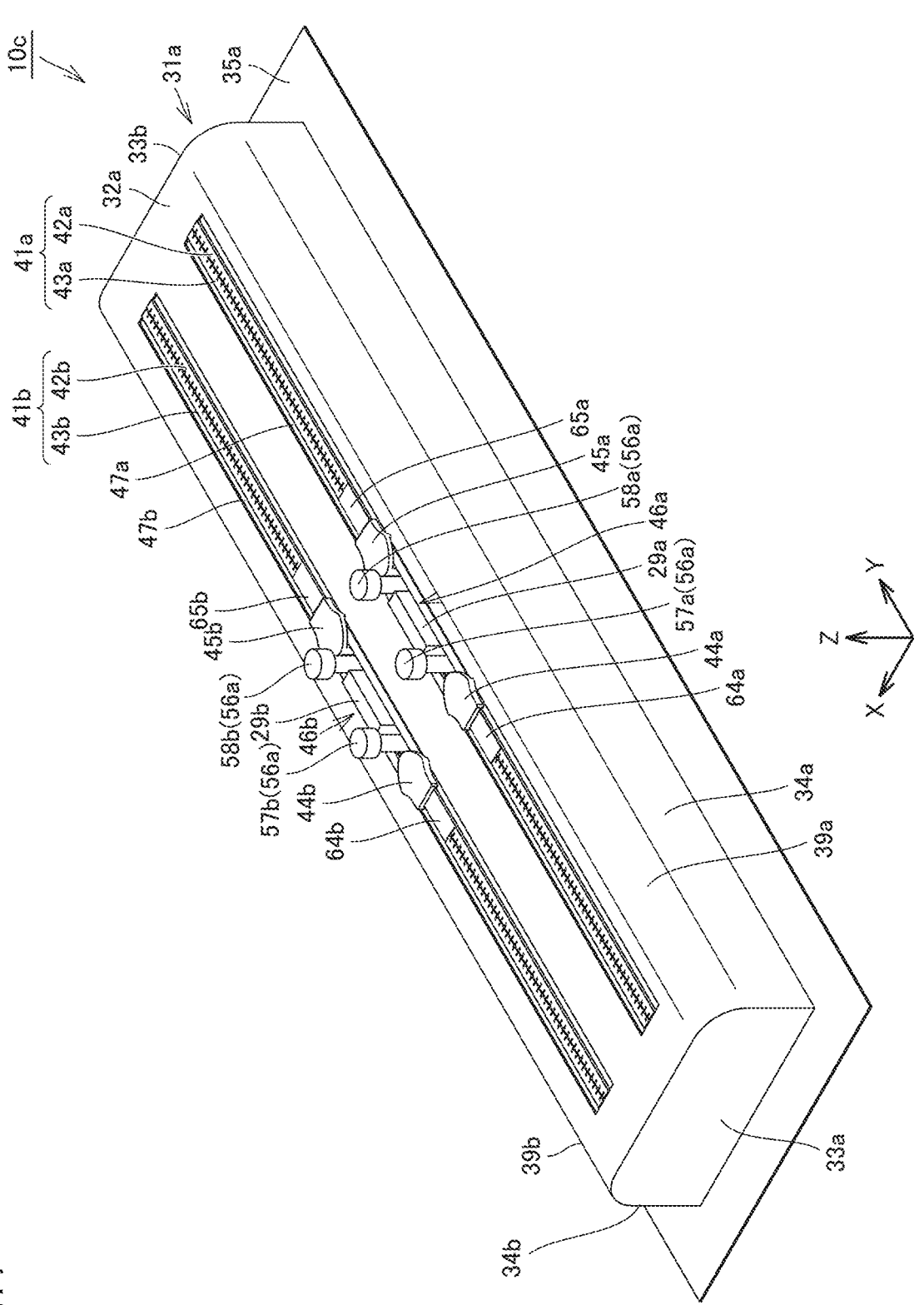
FIG. 11 is a schematic perspective view of a portion of a linear motion guide unit in Embodiment 3 of the present disclosure.

Yet another embodiment, Embodiment 3, will now be described. FIG. 11 is a schematic perspective view of a portion of a linear motion guide unit in Embodiment 3 of the present disclosure. In FIG. 11, the illustration of a moving member is omitted.

Referring to FIG. 11, in the linear motion guide unit 10*c* of Embodiment 3, a first front slider 44*a* and a first rear slider 45*a* have seal members 64*a* and 65*a* that sweep an upper portion of the region where a first right side element 42*a* and a first left side element 43*a* are engaged. A second front slider 44*b* and a second rear slider 45*b* have seal members 64*b* and 65*b* that sweep an upper portion of the region where a second right side element 42*b* and a second left side element 43*b* are engaged. In this configuration, the seal members 64*a* and 65*a* move during the movement of the first front slider 44*a* and the first rear slider 45*a*, and the seal members 64*b* and 65*b* move during the movement of the second front slider 44*b* and the second rear slider 45*b*, so the seal members 64*a*, 65*a*, 64*b*, and 65*b* are capable of reducing the risk of foreign matter deposited on top of the cover member 31*a* entering the inside of the cover member 31*a*. Accordingly, the risk of foreign matter entering the load-carrying races 18*a* and 18*b* can be reduced, and the smooth operation of the sliding member 21*a* can be more reliably ensured.

Embodiment 4

Figure 12:
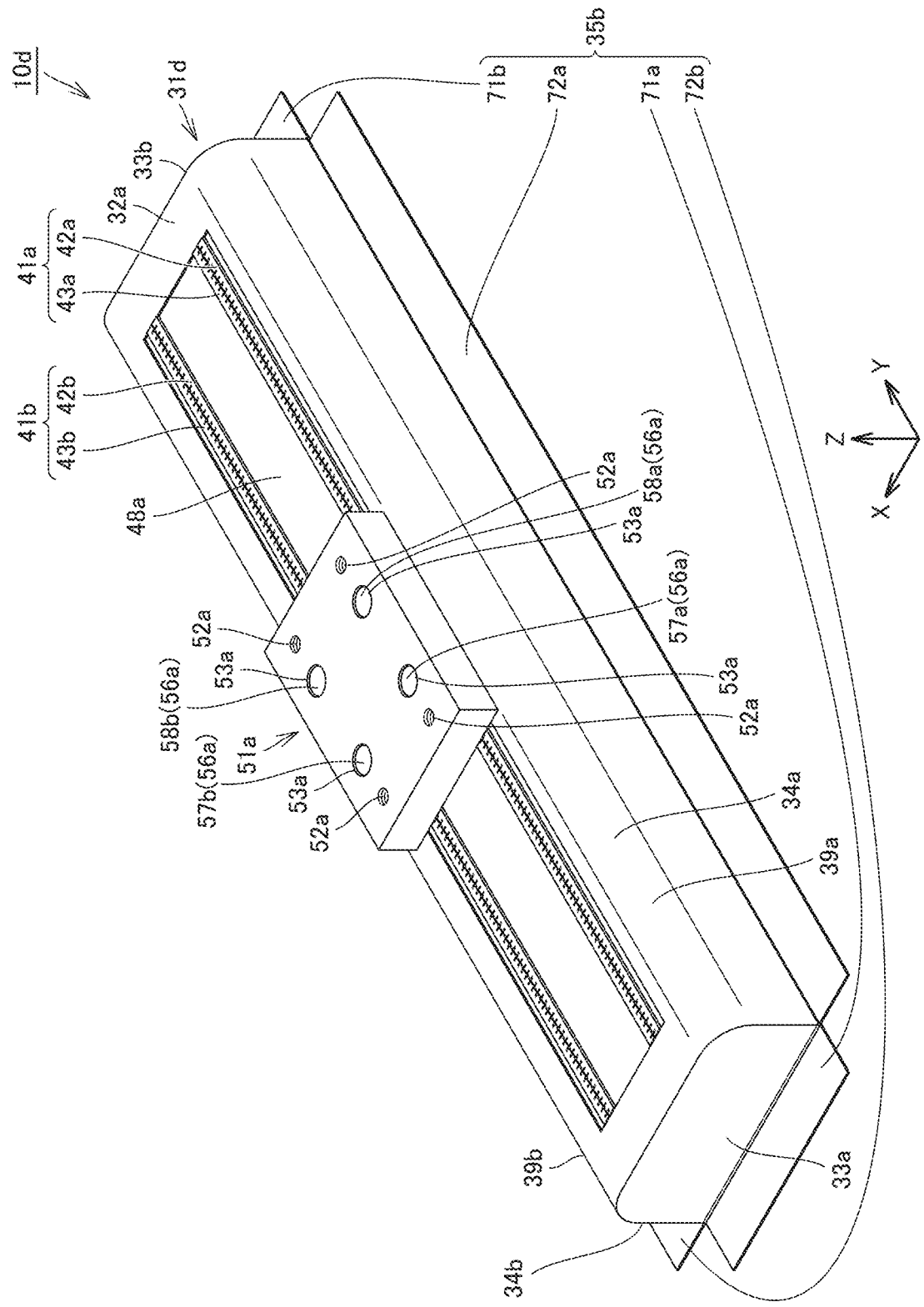
FIG. 12 is a schematic perspective view of a linear motion guide unit in Embodiment 4 of the present disclosure.

Yet another embodiment, Embodiment 4, will now be described. FIG. 12 is a schematic perspective view of a portion of a linear motion guide unit in Embodiment 4 of the present disclosure.

Referring to FIG. 12, in the linear motion guide unit 10*d* of Embodiment 4, a flat plate portion 35*d* of a cover member 31*d* includes a first region 71*a* connected to a front side wall portion 33*a*, a second region 71*b* connected to a back side wall portion 33*b*, a third region 72*a* connected to a right side wall portion 34*a*, and a fourth region 72*b* connected to a left side wall portion 34*b*. The first region 71*a*, the second region 71*b*, the third region 72*a*, and the fourth region 72*b* each have a rectangular shape as viewed in the Z direction. Here, the cover member 31*d* includes a tape member 48*a* provided at a position facing a rail upper surface 12*a*. A first left side element 43*a* is provided at one end in a width direction of the tape member 48*a*, which is a direction perpendicular to the longitudinal direction, and a second right side element 42*b* is provided at the other end in the width direction of the tape member 48*a*. In this manner, the risk of longitudinal misalignment between the first left side element 43*a* and the second right side element 42*b* can be reduced, and meandering of the tape member 48*a* can be suppressed.

Other Embodiments

While balls are used as the rolling elements in the above embodiments, the rolling elements are not limited thereto; rollers may be used as the rolling elements.

Further, while two rows of fasteners are provided in the above embodiments, the configuration is not limited thereto; one row or three or more rows of fasteners may be provided.

It should be noted that in the above embodiments, at least one of the right side element and the left side element may include an oil-containing resin provided at the portion where the elements are engaged with each other. With this, the oil components leaking from the oil-containing resin at the time of disengagement and engagement of the right side element and the left side element can promote the smooth movement of the right side element and the left side element, and the smooth operation of the sliding member can be ensured.

It should be understood that the embodiments disclosed herein are illustrative and non-restrictive in every respect. The scope of the present invention is defined by the terms of the claims, and is intended to include any modifications within the scope and meaning equivalent to the terms of the claims.

REFERENCE SIGNS LIST 10a, 10b, 10c, 10d: linear motion guide unit; 11a: rail; 12a: rail upper surface; 12b: rail lower surface; 13a: rail front surface; 13b: rail back surface; 14a, 14b: rail side surface; 15a, 15b: first raceway surface; 16: through hole; 17a, 17b: second raceway surface; 18a, 18b: load-carrying race; 19a, 19b: return passage; 20a: ball; 21a: sliding member; 22a: base portion; 23a, 23b: sleeve portion; 24a: sliding member lower surface; 25a: carriage; 26a: front end cap; 26b: rear end cap; 27a: intermediate member; 29a: mounting hole; 31a: cover member; 32a: upper wall portion; 33a: front side wall portion; 33b: back side wall portion; 34a: right side wall portion; 34b: left side wall portion; 35a: flat plate portion; 36a: opening; 37a: space; 39a, 39b: portion; 41a: first fastener; 41b: second fastener; 42a: first right side element; 42b: second right side element; 43a: first left side element; 43b: second left side element; 44a: first front slider; 44b: second front slider; 45a: first rear slider; 45b: second rear slider; 46a: first opening region; 46b: second opening region; 47a: first tape member; 47b: second tape member; 48a: tape member; 51a: moving member; 52a: attachment hole; 53a: connection hole; 54a, 54b: receiving recess; 56a: connecting member; 57a, 58a: first support member; 57b, 58b: second support member; 61a, 61b: shielding member; 64a, 64b, 65a, 65b: seal member; 71a: first region; 71b: second region; 72a: third region; and 72b: fourth region.

The invention claimed is:

1. A linear motion guide unit comprising:
a rail including a rail upper surface and a rail side surface each extending in a longitudinal direction, the rail having a first raceway surface provided on the rail side surface;
a sliding member relatively movably attached to the rail, the sliding member including a sliding member lower surface facing the rail upper surface and a second raceway surface facing the first raceway surface;
a plurality of rolling elements rolling on a load-carrying race constituted by the first and second raceway surfaces;
a cover member covering the rail and the sliding member, the cover member including a first fastener extending in the longitudinal direction;
a moving member arranged outside the cover member and moving together with the sliding member; and
a connecting member connecting the sliding member to the moving member;
the first fastener including
    a first right side element extending along the longitudinal direction,
    a first left side element extending in the longitudinal direction along the first right side element and engageable with the first right side element,
    a first front slider attached to the first right side element and the first left side element and fixed to the sliding member and the moving member, and
    a first rear slider attached to the first right side element and the first left side element, spaced apart from the first front slider in the longitudinal direction, and fixed to the sliding member and the moving member,
during movement of the sliding member and the moving member, the first front slider and the first rear slider each disengaging the first right side element and the first left side element from each other while the slider moves in a direction opposite to a side where the other slider is located, and engaging the first right side element and the first left side element with each other while the slider moves in a direction toward the side where the other slider is located,
the connecting member including a first support member arranged between the first front slider and the first rear slider in the longitudinal direction and supporting the moving member,
as viewed from the rail upper surface side in a direction perpendicular to the longitudinal direction,
a first opening region resulting from disengagement between the first right side element and the first left side element being placed in a position avoiding the rail.

2. The linear motion guide unit according to claim 1, wherein
the cover member includes a second fastener extending in the longitudinal direction and arranged parallel to the first fastener,
the second fastener includes
    a second right side element extending along the longitudinal direction and arranged adjacent to the first left side element,
    a second left side element extending in the longitudinal direction along the second right side element and engageable with the second right side element,
    a second front slider attached to the second right side element and the second left side element and fixed to the sliding member and the moving member, and
    a second rear slider attached to the second right side element and the second left side element, spaced apart from the second front slider in the longitudinal direction, and fixed to the sliding member and the moving member,
during movement of the sliding member and the moving member, the second front slider and the second rear slider each disengage the second right side element and the second left side element from each other while the slider moves in a direction opposite to a side where the other slider is located, and engage the second right side element and the second left side element with each other while the slider moves in a direction toward the side where the other slider is located,
the connecting member includes a second support member arranged between the second front slider and the second rear slider in the longitudinal direction and supporting the moving member, and
as viewed from the rail upper surface side in the direction perpendicular to the longitudinal direction,
a second opening region resulting from disengagement between the second right side element and the second left side element is placed in a position avoiding the rail.

3. The linear motion guide unit according to claim 2, wherein a region between the first left side element and the second right side element is composed of an elastic body.

4. The linear motion guide unit according to claim 2, wherein
the cover member includes a tape member provided at a position facing the rail upper surface, and
the first left side element is provided at one end in a width direction of the tape member which is a direction perpendicular to the longitudinal direction, and the second right side element is provided at another end in the width direction of the tape member.

5. The linear motion guide unit according to claim 3, wherein the cover member includes a tape member provided at a position facing the rail upper surface, and the first left side element is provided at one end in a width direction of the tape member which is a direction perpendicular to the longitudinal direction, and the second right side element is provided at another end in the width direction of the tape member.

6. The linear motion guide unit according to claim 2, further comprising a shielding member attached to the rail side surface and arranged between the rail side surface and the first opening region of the first fastener as viewed from the rail upper surface side in the direction perpendicular to the longitudinal direction.

7. The linear motion guide unit according to claim 2, wherein at least a portion of the cover member includes a structure made of a plurality of resin materials of different strengths stacked.

8. The linear motion guide unit according to claim 2, wherein at least a portion of the cover member makes an inside visible from an outside.

9. The linear motion guide unit according to claim 2, wherein at least one of the first front slider and the first rear slider is provided with a seal member operative to sweep an upper portion of a region in which the first right side element and the first left side element are engaged.

10. The linear motion guide unit according to claim 2, wherein the cover member includes an upper wall portion on which the first fastener is provided, and a side wall portion connected to the upper wall portion and extending in a direction intersecting the upper wall portion, and the portion where the upper wall portion and the side wall portion are connected is configured with a curved surface.

11. The linear motion guide unit according to claim 2, wherein at least one of the right side element and the left side element includes an oil-containing resin provided at a portion where the elements are engaged with each other.

12. The linear motion guide unit according to claim 1, further comprising a shielding member attached to the rail side surface and arranged between the rail side surface and the first opening region of the first fastener as viewed from the rail upper surface side in the direction perpendicular to the longitudinal direction.

13. The linear motion guide unit according to claim 1, wherein at least a portion of the cover member includes a structure made of a plurality of resin materials of different strengths stacked.

14. The linear motion guide unit according to claim 1, wherein at least a portion of the cover member makes an inside visible from an outside.

15. The linear motion guide unit according to claim 1, wherein at least one of the first front slider and the first rear slider is provided with a seal member operative to sweep an upper portion of a region in which the first right side element and the first left side element are engaged.

16. The linear motion guide unit according to of claim 1, wherein the cover member includes an upper wall portion on which the first fastener is provided, and a side wall portion connected to the upper wall portion and extending in a direction intersecting the upper wall portion, and the portion where the upper wall portion and the side wall portion are connected is configured with a curved surface.

17. The linear motion guide unit according to claim 1, wherein at least one of the right side element and the left side element includes an oil-containing resin provided at a portion where the elements are engaged with each other.

\* \* \* \* \*